3,220,179
CATALYTIC AFTERBURNER FOR INTERNAL COMBUSTION ENGINES AND THE LIKE
John J. Bloomfield, Burbank, Calif., assignor of ten and forty-two one-hundredths percent to Walter P. Innes, Jr., eight and seventy-five one-hundredths percent to Betty S. Innes, eight and seventy-five one-hundredths percent to Walter P. Innes III, eight and seventy-five one-hundredths percent to William D. Innes, six and sixty-seven one-hundredths percent to Ann Katherine Phillips, three and thirty-three one-hundredths percent to Helen P. Brown, one and eleven one-hundredths percent to Ann Woods Lander, one and eleven one-hundredths percent to Julia Woods Lavender, and one and eleven one-hundredths percent to Delos Woods Nye
Filed Oct. 31, 1962, Ser. No. 234,485
13 Claims. (Cl. 60—30)

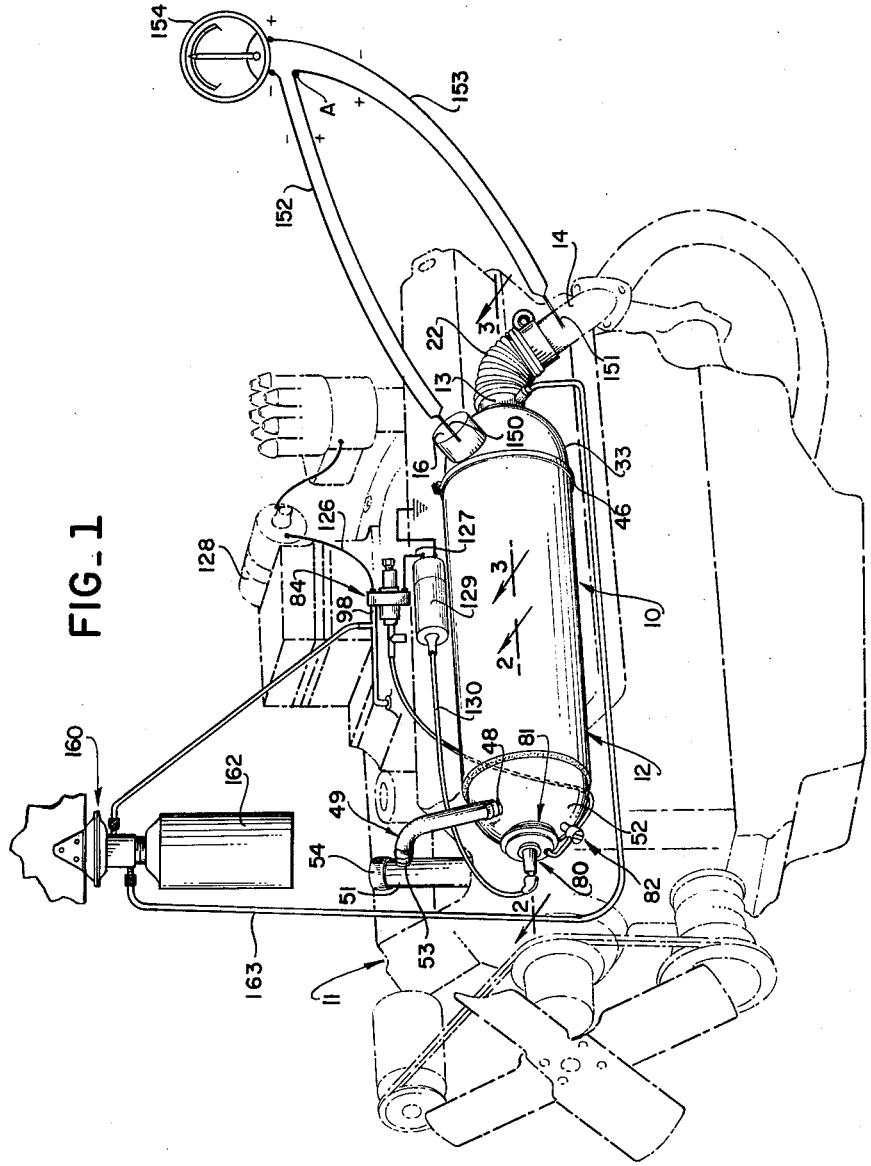
INVENTOR.
JOHN J. BLOOMFIELD
By R. E. Grangne
Attorney

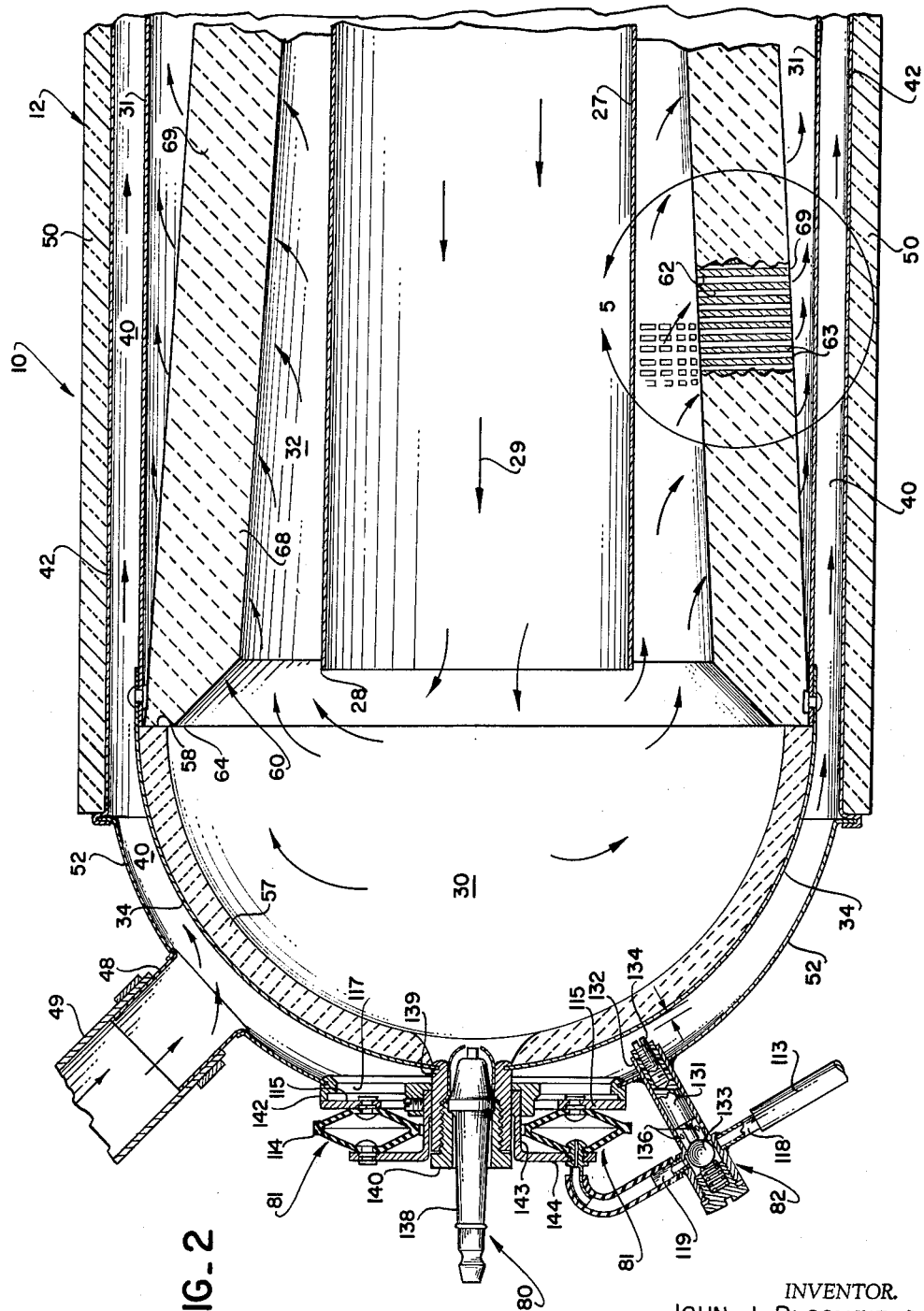

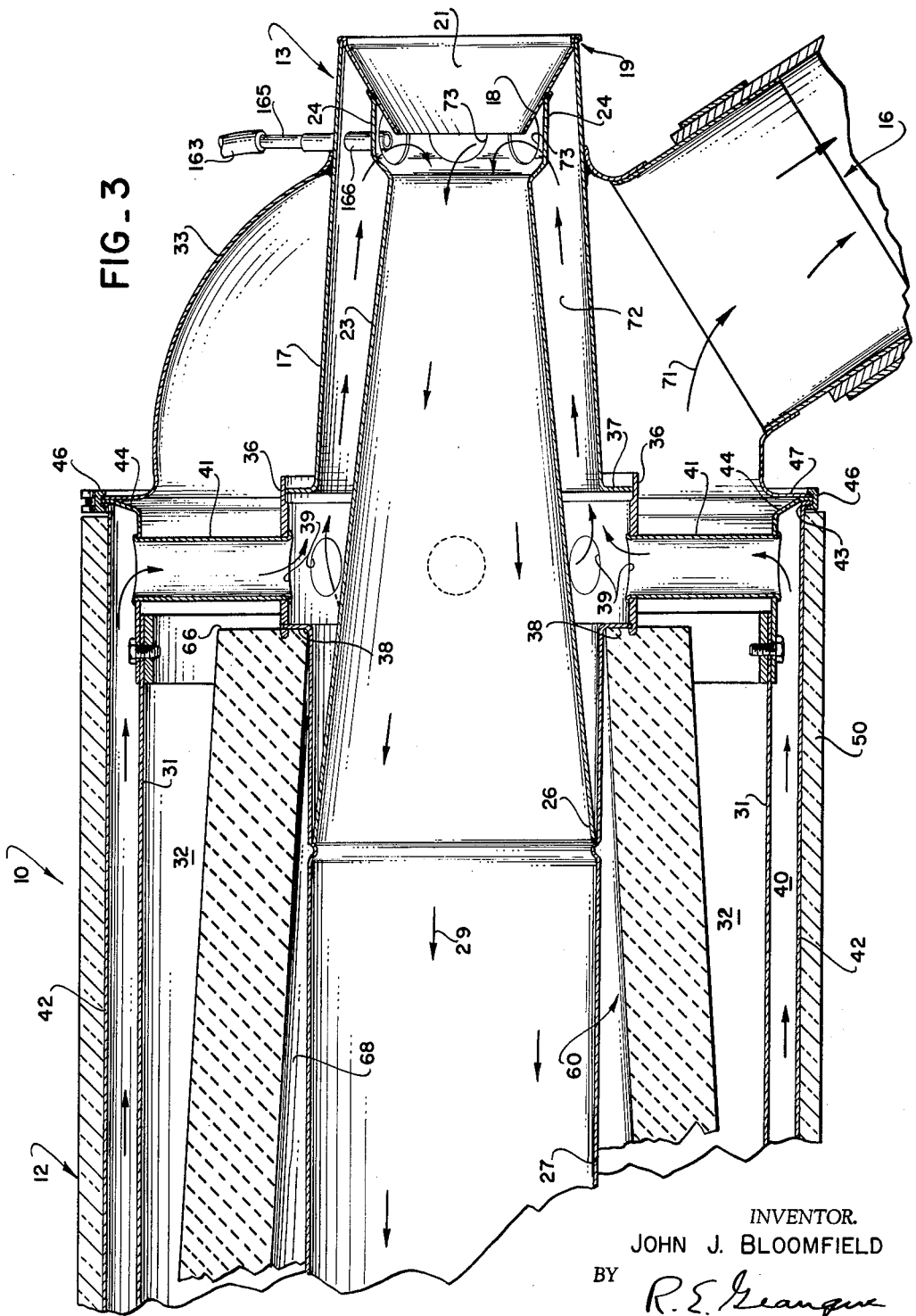

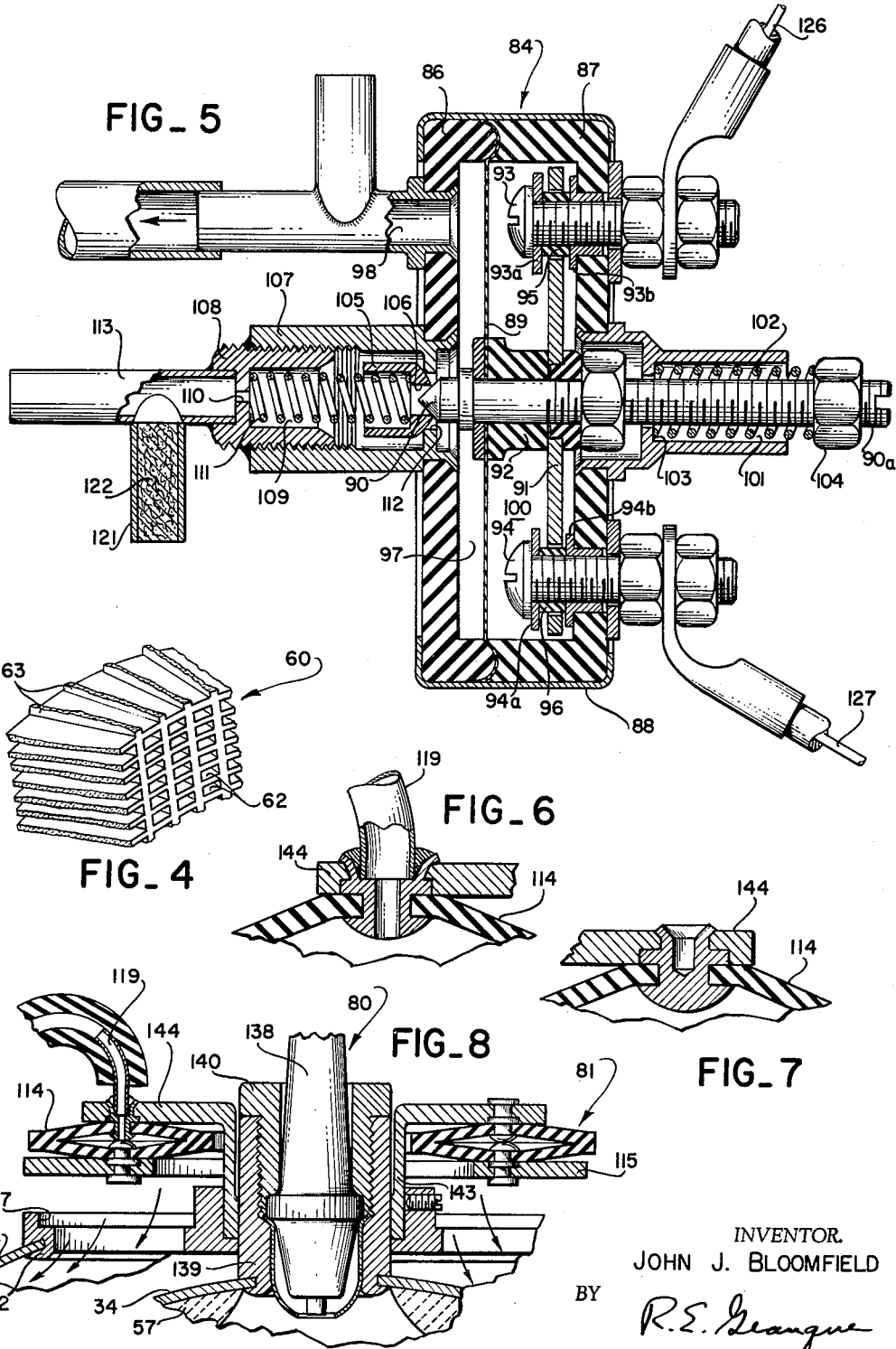

This invention relates to a device for eliminating one of the major causes of air polution and more particularly to a catalytic afterburner for burning unburned and partly burned hydrocarbons and other noxious fractions of the exhaust and the blow-by gases emitted by internal combustion engines, and the like.

A gasoline engine, in the process of converting heat into mechanical work, functions as an extremely complex chemical factory. For automotive use, the engine must function smoothly over a relatively wide range of power output. For perfect combustion within the engine, a diet of one pound of fuel to every fifteen pounds of air is indicated. However, experience has shown that for smooth idling, a much richer mixture is required; for acceleration, a massive shot of excess fuel is momentarily required to insure that the engine does not falter; for maximum power output, a rich mixture is essential: on deceleration, an unstable regime is established and a high percentage of engine misfiring results; and finally, when cruising at a steady rate of speed, a mixture leaner than 15:1 gives maximum economy. It is the function of the carburetor to insure that these complex requirements are met.

Thus, even with perfectly functioning carburetion systems, it is noted that, except for cruising, automotive engines operate at mixture ratios substantially richer than stoichiometric.

Along with harmless carbon dioxide and water vapor, which would be the only products if combustion were perfect, various percentages of carbon monoxide, unburned hydrocarbons, partly oxidized hydrocarbons, carbon black, nitrogen oxides, as well as percentages of solid and gaseous compounds of sulphur, lead, bromine, chlorine and phosphorus leave the vehicle by way of the exhaust pipe under all conditions. However, under cruising conditions there is a marked reduction in the carbon monoxide and unburned and partially oxidized hydrocarbons. Also, soot is largely eliminated; but there is a sharp rise in nitrogen oxides.

It is noted that such undesirable products are emitted into the atmosphere by gasoline engines even if the engine is in perfect mechanical condition. However, cylinder bores, pistons, and piston rings do wear and, after approximately twenty to twenty-five thousand miles of operation, ever-increasing quantities of hot gases which should be producing power, blow by, or leak past, the pistons into the crankcase. These blow-by gases not only contaminate the lubricating oil, but eventually escape into the atmosphere. Volumetrically, the ratio of blow-by gases to the exhaust gases is low; however, the largest percentage of gases blow by the pistons while the pressure in the cylinders is high, i.e., early in the expansion stroke while the combustion is yet incomplete.

Passage of these gases between the relatively cool cylinder walls and piston skirts effectively snuffs out further chemical activity. Hence, per volumetric unit, the blow-by gases are a much more potent source of air pollution than are the exhaust gases which leave the vehicle by way of the exhaust pipe.

It is highly desirable and therefore one of the principal objects of this invention to provide a new and improved device in which the pollutants which issue from both the exhaust pipe and the crankcase of an internal combustion engine, and the like, be rendered harmless before they enter the atmosphere and, for the sake of simplicity and efficiency, that this object be accomplished by a single device.

Another object of this invention is to provide a new and improved device of the character described which provides additional oxygen to the pollutants under preselected conditions to insure complete conversion to harmless products except under cruise conditions in which the engine starts with an excess of oxygen and ends up with nitrogen oxides in the exhaust stream.

Nitrogen oxides in the exhaust are more recently recognized as being one of, if not the most, harmful and irritating components of the pollutants in our atmosphere.

It is therefore, another object of this invention to provide means whereby the nitrogen oxides are eliminated or appreciably reduced, including means for subjecting the nitrogen oxide to a process of reduction whereas the other pollutants are oxidized.

It is submitted that carbon monoxide, another of the deadly components of the exhaust gases, is an excellent reducing agent; therefore, by providing a suitable environment in the device, in accordance with this invention, the nitrogen oxides and the carbon monoxide may be induced to react on each other and the harmful effects of both thereby eliminated.

Another object of this invention is to automatically vary such an environment to meet the needs as determined by fluctuations in engine operating conditions.

The most important factor which must be considered in providing a suitable environment, as referred to above, is temperature. A well known empirical finding proclaims that speed of chemical action is approximately doubled for each ten degree centrigrade rise in the temperature of the reactants. However, there are both upper and lower limits of temperature, beyond which the above no longer applies. If the temperature reaches too high a value, a reverse reaction becomes predominant and compounds previously formed are broken up. Furthermore, high temperatures and many materials of construction, particularly metallic materials, are not compatible; not only do the latter lose physical strength, but in the presence of oxygen they disintegrate rapidly.

At lower temperatures, no measurable rate of reaction is observed until sufficient heat or activation energy is added from an external source to raise the temperature of the reactants to the ignition point. It is from this (ignition) point that the temperature-speed of reaction relationship applies. The ignition point varies over a wide span. It ranges from approximately 650 degrees F. for gasoline, 800 degrees F. for acetylene, 900 degrees F. for propane, and 1,100 degrees F. for hydrogen, to 1,200 degrees F. for carbon monoxide, all mixed with air at atmospheric pressure.

The next most important factor which controls speed of reaction is concentration. The presence of inert diluents, the nitrogen in air for example, reduces concentration, whereas compression increases concentration. Within an engine cylinder, despite the fact that inert nitrogen represents approximately 75% of the charge, the passage of an electric spark generates such local high temperature that a spherical flame-front is established and combustion progresses throughout the compressed charge quite rapidly. It is an object of the present invention to provide an afterburner for exhaust gases having a suitable environment for combustion even though the exhaust gases leaving the engine have a concentration of diluents unfavorable for combustion of the combustibles remaining therein.

Another object of this invention is to provide new and improved aspirator means for inducting auxiliary air into the device said means being actuated by the stream of the exhaust gases emitted by the engine into the inlet of the device.

Yet another object of this invention is to provide a new and improved aspirator of the character described which automatically adjusts the flow of auxiliary air to match the flow of the exhaust gases, is relatively light and simple in construction, more compact, and durable than other devices previously provided for this purpose and performs its function without building up excess back pressure on the engine.

Another object of this invention is to provide means whereby auxiliary air and spark ignition are supplied within the combustion chamber of the afterburner of this invention at all times except during the cruise operation of the vehicle, at which time admission of auxiliary air would be detrimental to the function of the device to reduce nitrogen oxide emission; as previously mentioned.

A further object of this invention is to provide a new and improved catalyst means for accelerating combustion of unburned and partially burned hydrocarbons and other noxious fractions of exhaust gases from an internal combustion engine, and the like, so as to make practical the oxidation or reduction thereof in the relatively short space and time available in an afterburner of the type herein considered.

Another object of this invention is to provide improved means for renewing and/or recoating the catalyst means within the afterburner so as to prolong the life and efficiency thereof, such means being selectively either continuously, automatically, or intermittently operative.

A further object of this invention is to devise an afterburner of the character described which is sufficiently compact in configuration so as to permit the installation thereof under the hood and as closely adjacent to the engine as is practicable and so as to enable installation thereof in a manner such that effluents therefrom are least objectionable to the occupants of the vehicle and all others in the immediate vicinity.

A further object of this invention is to provide a new and improved afterburner of the type described of lowest possible weight, and one which lends itself readily to easier assembly and disassembly thereof, and to be capable of mass production and inter-changeability of parts thereof.

Yet another object of this invention is to provide a new and improved refractory utilized in a liner and foraminous sleeve, for supporting the catalytic agent, and for protection of the metallic portions used in the construction of the afterburner against the destructive effects of the hot reacting gases.

A further object of this invention is to provide a catalyst support structure which presents a maximum extended surface area for direct contact with the stream of gases, whereby efficiency of conversion is enhanced.

A further object of this invention is to provide a catalyst support structure which presents a relatively large cross-sectional area available for flow so that the pressure drop through the unit is low and the residence time of the gases while in transit and in contact with the catalyst is correspondingly high.

A further object of this invention is to provide light, strong catalyst carriers which are self-supporting structures and immune to the destructive effects of attrition and loss of catalyst support material which is common with beds of granular material retained by metallic grids.

Another object of this invention is to provide a new and improved catalytic afterburner of the character described which provides new and improved control valve means for controlling of the intake of auxiliary air and of the spark used for initiation of combustion within the afterburner, said control valve means functioning in response to changes of the intake manifold depression.

Another object of this invention is to provide a control means which is operative to protect the afterburner against excessive temperature rise by providing a thermal relief valve which overrides the actions of the intake manifold pressure on the auxiliary air valve to automatically shut off flow of auxiliary air when a predetermined temperature is reached.

A general object of this invention is to provide a new and improved catalytic afterburner of the character described which overcomes disadvantages of prior means and methods heretofore intended to accomplish generally similar purposes.

These and other objects of this invention will be more apparent from the drawings, the following detailed description and appended claims.

In the drawings:

FIGURE 1 is a perspective view, in elevation, of the catalytic afterburner of this invention, illustrated as being associated with an internal combustion engine;

FIGURES 2 and 3 are enlarged, fragmentary, longitudinal cross-sectional views, as taken substantially along the lines 2—2 and 3—3 of FIGURE 1, respectively, so as to more clearly illustrate the device of FIGURE 1 when joined together at common break lines to the right and left of the figures respectively;

FIGURE 4 is an enlarged, fragmentary, cross-sectional view, in perspective, of an area of a catalyst support, as indicated by the encircled portion 5 of FIGURE 2, such an area being typical of the cross-section of the catalyst support element illustrated therein;

FIGURE 5 is a vertical, cross-sectional view taken substantially at the center of the control valve means shown in FIGURE 1;

FIGURE 6 is a vertical, cross-sectional view illustrating more clearly the vacuum connection for the bellows of the air valve means of FIGURE 2;

FIGURE 7 is an enlarged, vertical, cross-sectional view of the attachment for the bellows of FIGURES 2 and 6; and FIGURE 8 is an enlarged, vertical, cross-sectional view, similar to the left end of FIGURE 2, showing the bellows in a collapsed condition.

Referring in detail to the drawings, there is shown, by way of illustration, but not of limitation, an improved catalytic afterburner for internal combustion engines, designed and constructed in accordance with this invention and generally designated by the numeral 10. The apparatus 10 is illustrated herein as associated with an internal combustion engine, generally designated by the number 11, and generally including a housing 12, defining an elongated chamber having an inlet 13 at one end, adapted to be connected to receive exhaust gases from an outlet exhaust manifold 14 of the engine 11 and an outlet 16 communicating with the atmosphere for exhausting the gases after being processed in the apparatus 10.

The inlet 13 includes an outer tubular wall portion 17 in detachable relationship to the housing 12 and having an inwardly-extending, conical wall portion 18 removably secured, as a snap fit, at the outer end of the portion 17, as indicated at 19, to form an inlet opening 21 communicating with the outlet of manifold 14 as by a flexible coupling 22 (FIGURE 1) so as to convey exhaust gases from the manifold 14 to the inlet 21. A cylindrical section 23 is formed by a conical wall having its outer end 24 adapted to coextensively engage the inlet wall portion 18 and an inner end 26 removably fitted to an elongated tubular element 27, which is coextensive with the wall portion 17 and has an inner end 28 providing an outlet terminating adjacent the opposite end of the housing 12. The portion 18 forms a nozzle for receiving exhaust gases from the manifold 14, the gases being constricted in the nozzle and gradually expanded in the tubular element 23 to deliver the exhaust gases, indicated by the arrowed lines 29, into the opposite end of the chamber 12 which defines the combustion chamber generally designated by the numeral 30.

The chamber 30 is further defined by cylindrical wall 31 annularly spaced from the tubular member 27 and forming an annular space 32 therebetween, the space being enclosed at opposite ends by spherical walls 33 and 34. The spherical wall 33 is adjacent the inlet 13 and the outlet 16, whereas the spherical wall 34 is adjacent to the combustion end (left, as viewed in FIGURE 2) of the chamber 30. The tubular member 27 is formed with an outwardly-extending flanged shoulder 38 to which an inner end 37 of the tubular member 17 is yieldably secured by means of a tubular member 36 which is preferably a discrete part connecting the elements 17 and 27. Member 36 contains a plurality of radial openings 39 connected by transverse tubular members 41 to communicate wth a second chamber generally designated by the number 40 and defined by a second cylindrical wall 42 annularly spaced from the cylindrical wall 31.

One end 43 of the wall 42 is secured to an adjacent, outwardly-flanged end 44 of extended wall 31 as by an annular clamping member 46, the flange 44 being clamped togeher with an outwardly-extending flange 47 of the spherical member 33. The cylindrical wall 42 is preferably provided with an external cylindrical liner 50 of heat-insulating material to prevent heat loss from gases which flow through the chamber 40, as will be hereinafter described. The annular chamber 40 is further defined by an outer spherical wall 52 fixed in spaced relationship to the spherical end wall 34 and to the outer end of cylindrical wall 42. A tube section 48 communicates with chamber 40 and is connected by means of a connector member 49, to an outlet of a vertical oil-filler tube 51 (see FIGURE 1) normally provided on engines to communicate with gases in the crankcase of an engine like the engine 11. The connector 49 may be conveniently and practically connected to receive blow-by gases from the oil-filler tube 51 as by a transverse outlet 53. A tight cap 54 is provided for the tube 51 and the usual crankcase ventilator tube (not shown) is closed off so that no fresh air can enter the crankcase during operation of the engine and the connector member 49 will transport only blow-by gases from the crankase to chamber 40.

The spherical wall 34 of the combustion chamber 30 is preferably internally fitted with a removable and replaceable liner 57 of heat-insulating, catalyst-impregnated, refractory material forming a shield to protect the spherical wall 34 from the heat of combustion within the chamber 30, the liner or shield 57 having a shoulder 58. A catalyst-impregnated and/or coated sleeve generally designated by the numeral 60, is located between shoulder 58 and shoulder 38 of tubular element 27.

The sleeve 60, as best seen in the FIGURES 2, 3 and 4 is thick-walled and fabricated from a refractory material having a relatively-high heat tolerance. The wall is preferably frusto-conical, and is perforated by a very large number of flat end venturi-form passages 62, shown in perspective and in greater detail in FIGURE 4. The passages 62 of structure 60 are formed by a plurality of relatively narrow radial ribs 63 which serve to tie together a plurality of thin, annular rings to effect a body which is structurally strong and light in weight and presenting a relatively large surface area to the exhaust gases in the annular space 32. The sleeve 60 is relatively large at one end 64 so as to be supportable in abutment with the shoulder 58 of the liner 57. The sleeve 60 is reduced gradually in diameter towards its opposed end 66 to have a relatively small end abutting the area of the shoulder 38 whereby the sleeve 60 is conveniently disposed and securely supported between the shoulders 58 and 38 and intercepts the passage of the gases through the chamber 32 so that they pass through the openings 62 of the sleeve 60. The gases pass from the gradually narrowing inner portion 68 to a gradually increasing outer portion 69, and then flow (as indicated by the arrowed line 71) through the chamber defined by the spherical portion 33 and thence outwardly of the housing through the outlet 16.

In accordance with this invention, the sleeve 60 and the liner 57, are formed in their above described configurations from refractory materials, the materials preferably being derived from silicon and aluminum oxides and then fired. After firing, they are relatively porous and will absorb large volumes of highly soluble chromic anhydride ($CrO_3$) solution. The sleeve and the liners are then dried and baked, whereupon $CrO_3$ is converted into insoluble $Cr_2O_3$ within the pores of the body 60 but what is more important, an appreciably thick film of catalyst, in the form of a soot-like deposit, is attached to all exposed surfaces. This film is not only in a highly activated state, but, while being firmly adherent, is subject to and does slowly erode away under the scouring effect of the stream of exhaust gases passing through the afterburner. Thus, in accordance with this invention, the scouring effect of the gases continuously exposes fresh surfaces of the catalyst film.

To compensate for such erosion, means are provided for automatically, continually, or intermittently, depositing a fresh surface on the sleeve 60 and liner 57 in a manner to be hereinafter described so that a uniformly high catalytic efficiency is maintained. Also, in accordance with this invention, the construction is readily and easily assembled and disassembled so that the catalyst support bodies may be readily interchanged, if that should ever become necessary.

Further, in accordance with the preceding description, exhaust gases flow from the manifold 14 of the engine 11 to enter through the inlet 21 of the apparatus 10 to flow through the tubular member 27 and into the combustion chamber 30, and, thereafter, through the annular chamber 32, such gases passing through the passages 62 of the sleeve 60 whereby chemical activity is accelerated by the catalyst material of the sleeve. The gases then flow through spherical end wall 33, and outwardly through the outlet 16. Meanwhile, blow-by gases from the tube 51 of the engine 11 flow through connector 49, through the inlet 48 and into the chamber 40, and from thence, inwardly through the passages 41 to the openings 39 in the walled portion 37. A plurality of openings 73 are located in the wall portion 24 and connect the interior of the tube 23 with the openings 39 through space 72 so that the gases flowing into the combustion chamber 30 from the inlet 21 are joined by the blow-by gases drawn from the crankcase through inlet 48. Thus, the blow-by gases enter the combustion chamber 30 along with the exhaust gases.

Means are provided for selectively firing the gases within the combustion chamber 30. The igniting means, generally designated by the number 80, is responsive to the function of an auxiliary air control valve 81 and is, therefore, described herein in connection with the auxiliary air control valve means 81.

To more readily understand the function of the auxiliary air control means 81, as associated with the ignition means 80, the following is to be understood: When the carburetor throttle on an engine is closed, the engine is literally throttled or strangled and, in attempting to take in air, builds up a vacuum in the intake manifold as a symptom of its distress. As the throttle is opened, the vacuum is reduced and the power output increases. It is standard pratcice to measure this vacuum in inches of mercury (Hg).

Between one and nine inches Hg, an engine is operating at maximum to moderate power output, respectively. This represents acceleration, hill climbing and high car speed operating conditions.

Between nine and seventeen inches Hg, the vehicle can be considered to be cruising along a relatively level road, nine inchs corresponding to 70–75 miles per hour and seventeen inches to 20–25 miles per hour.

Between eighteen and twenty inches Hg, the engine is idling. Fast idle gives a higher reading than a slow idle. To make an engine idle fast, one has to crack the throttle open more and one would expect a lower, rather than a higher reading. The reason for the apparent discrepancy is that the engine is just a more effective vacuum pump at a higher idling speed. This also explains why, on deceleration, when the car drives the engine rather than vice versa, the intake manifold depression rises to as much as twenty-five inches Hg because, with the throttle closed and the engine turning over at a higher r.p.m. than even fast idle, the engine is an even better vacuum pump.

Between nine and seventeen inches Hg, the modern carburetor is calibrated to run leaner than 15 to 1 air-fuel ratio, that is, with an excess of air, so that no auxiliary air is needed at this time. Not only is it not needed, but additional air at this time will make it impossible for carbon monoxid to reduce nitrogen oxides, which is one of the more important advantages of the present invention.

Therefore, in consideration of the above, the requirements which the control means must satisfy and in accordance with this invention, does satisfy, are:

During the cruising operation (nine to seventeen inches of mercury) no ignition occurs in the combustion chamber 30 and the auxiliary air valve means 81 is closed;

At all other times 1″ to 9″ Hg and 17″ to 25″ Hg, a spark is supplied at the ignition means and auxiliary air is admitted into the afterburner by the auxiliary air valve means 81. However, if at any time the afterburner temperature becomes excessive, auxiliary air is shut off.

To accomplish the above, the auxiliary air valve means 81 is controlled by a control valve 84 to either open or close, to admit or shut off, respectively, the flow of auxiliary air into the afterburner 10, in response to changes of inlet manifold vacuum. Control valve 84 also determines whether the afterburner spark generator shall function or not. A thermal relief valve 82 is provided to protect the afterburner 10 against excessive temperature rise.

The control valve generally designated as 84 is shown in FIGURE 1 and, in greater detail, in FIGURE 5 and comprises a relatively shallow cup-shaped portion 86 and a relatively deeper cup-shaped portion 87 molded or otherwise formed from a dielectric material, such as a synthetic resin, the portions 86 and 87 being held together by an outer, metallic annular sleeve 88. Clamped between the two cup-shaped portions 86 and 87 is a relatively thin, flexible diaphragm 89 formed from rubber, neoprene, coated fabric, or the like. A needle valve 90 and a relatively thick, rigid metallic contact strip 91 are secured to the diaphragm 89, substantially centrally thereof for movement therewith. The contact strip 91 is insulated from the needle valve 90 by a sleeve element 92 of dielectric material and from the pair of laterally spaced terminals 93 and 94 by sleeves 95 and 96, respectively, so that only when at opposite extremes of travel of the diaphragm 89 is electrical contact made between the terminals 93 and 94 through the strip 91. Therefore, the contact strip 91 not only serves as a two-way electrical switch, but as a stop to limit the travel of diaphragm 89, since strip 91 engages either contact 93a or 93b for terminal 93 and either contact 94a or 94b for terminal 94.

The space 97 to the left of the diaphragm 89, as viewed in FIGURE 5, is continually in communication with the engine intake manifold through a passageway 98. The space 100, to the right of the diaphragm 89, as viewed in FIGURE 5, is opened to the atmosphere through a tubular element 101 secured to the cup-shaped element 87. A spring 102 is preloaded between a shoulder 103 of element 101 and an adjustable nut 104 on threaded end 90a of valve 90 to bias the diaphragm 89 to the right, as viewed in FIGURE 5. Under the influence of this preload, the contact strip 91 is biased to complete an electrical circuit between the terminal contacts 93b and 94b and pulls the needle valve 90 away from its seat 106 on the spherically-faced, cup-shaped member 105. The member 105 is located within extension 107 which is connected with element 86 and threaded to receive plug 108 which defines, with extension 107, a passageway 109 leading to an orifice 110 in plug 108. A spring 111, acting against plug 108, normally biases seat 106 against the circumference of opening 112 in extension 107. The preload of spring 102 is preferably adjustable so as to be variable to suit engines of different power outputs.

When the diaphragm is extended to the right, under the force of the spring 102, and contact is made between the strip 91 and the terminals 93 and 94, to close the electrical circuit, intake manifold vacuum is now communicated through opening 112 and orifice 110 to passageway 113 communicating between the chamber 97 and the auxiliary air valve 81 to collapse a bellows 114 thereof. This condition of the control valve 84 exists until the inlet manifold vacuum increases to about 9 inches Hg.

The bellows 114, preferably formed of a flexible and resilient material, controls relative movement of a normally relatively-flat plate 115 to either open or close an opening 117 communicating between the annular chamber 40 and ambient air. The passageway 113 is adapted to be connected at its outer end to the inlet tube 118 of the thermal relief valve 82 which, in turn, has an outlet 119 connected by a flexible tubular member 120 to communicate with the interior of the bellows 114.

As manifold vacuum approaches nine inches Hg, plus or minus two inches depending on engine size, the pull on the diaphragm 89 exceeds the preload of the spring 102 closing the seat 106, by seating of the needle valve 90 thereagainst; at the same time, the contact strip 91 breaks its contact between the terminals 93 and 94 so as to break the circuit to the afterburner spark generator 80. An extension 121 to the passageway 113 is preferably packed as by wool, felt or the like, indicated by the numeral 122 which serves as a leak or high resistance flow path of uniform and controllable character. With the needle valve 90 seated, vacuum in the relatively small volume of the connecting line 113 and the bellows 114 is quickly restored to atmospheric pressure and the resiliency of the bellows causes the bellows to close the auxiliary air valve by seating of the plate 115 to close the opening 117. A dashpot effect is therefore provided and a possible chattering or clattering of the air valve 81 effectively precluded.

The situation now remains in status quo, with the air valve 81 closed and the spark to the ignition means 80 off, until the manifold vacuum approaches seventeen inches plus or minus two inches Hg as determined by the independent setting of the preload of second spring 111 by adjustment of plug 108. A slight increase in the manifold vacuum increases the force exerted by the diaphragm 89, this force being transmitted through the needle valve 90 to the spherically faced cup 105 which, in turn, leaves its seat to clear opening 112, and the contact strip 91 re-establishes the spark generator circuit. The terminal 93 is connected by electrical condutcor 126 to spark coil 128 and terminal 94 is connected by electrical conductor 127 to spark generator 129 which in turn connects with ignition means 80 through lead 130. Thus, the auxiliary air valve means 81 reopens when the manifold vacuum is greater than 17″ Hg, and the spark generator is reactivated.

The thermal relief valve 82 is provided for preventing excessively high temperatures in the afterburner 10. The thermal relief valve 82 includes a plunger 131 movable in a lower tubular portion 132 of the valve, the tube 132 being closeable by a spring-biased ball 133 seated at an upper end thereof. The tubular extension 132 is located between the passageways 118 and 119 leading to the annular chamber 40. A set screw 134 is adjustably set to limit the movement of plunger 131. As the temperature of the afterburner approaches a maximum, the spherical wall 34 engages the set screw 134 and unseats the ball 133 seated on the tubular extension 132, whereby atmospheric pressure is admitted to the space within the bellows 114. Since the inner wall elements 31 and 34 are anchored to outer wall elements 42 and 52 at only one end and since the inner elements get hotter, they move relative to the outer elements to move set screw 134. The air at atmospheric pressure flows through breather holes 136 at the same time the intake manifold is attempting to maintain a vacuum in the bellows 114. The function of the orifice 110 (see FIGURE 5), on the left hand side of the control valve 84, will be now more apparent. The quantity of air which can pass through the orifice 110 is so small that, on one hand, the air-fuel mixture ratio of the engine is not adversely affected and on the other hand, the ball 133 need not move off its seat too far before the flow of air past the ball is greatly in excess of that which can flow through the orifice. As a result, the vacuum in the bellows is effectively overcome and the auxiliary air valve plate 115 is extended against the opening 117 to close the opening. Heat energy release, inside of the afterburner is thereby sharply curtailed and the excessive temperature rise is halted.

It will be noted that the supporting structure for spark plug 138 of the ignition means 80 securely retains the concentric relationship between the inner and outer spherical walls 34 and 52, respectively. A boss 139 is secured to the spherical wall 34 by flaring, or the like, and a spark plug retainer 140 is threadedly secured therein so that during relative movement of the inner and outer wall structure, there is no stress placed between the wall elements. Relative motion between the sleeve boss 139 and the wall 52 is permitted since member 142 containing opening 117 is secured to wall 52 and supports tubular element 143 through which boss 139 can move. The flange 144 on element 143 supports bellows so that the bellows is fully supported by wall 52. It should be noted that not only does this freedom or relative motion prevent build-up of undesirable stress but it provides thermostatic sensing and control means of relatively simple construction that is as durable and reliable as the structure itself.

As best seen in FIGURE 1, the afterburner apparatus 10 is most advantageously installed beneath the hood of the vehicle and adjacent to the engine 11. It has been found more advantageous, in accordance with the present invention, to mount the apparatus adjacent the engine and preferably attached thereto so that a minimum of heat is lost from the exhaust gases from the time they leave the manifold 14 to the time they enter the afterburner apparatus 10. Also, relative movement between the apparatus and the engine is largely reduced or eliminated and the danger of leaky or fractured joints is substantially reduced. The gases leave the afterburner 10 through the discharge opening 16 and enter suitable ducting (not shown) through which they finally enter the atmosphere.

As best seen in FIGURE 1, thermocouple elements 150 and 151 are preferably installed in the manifold outlet 14 and the afterburner outlet 16, respectively. Conductors 152 and 153 may then be connected from the elements 150 and 151 to an instrument, such as a millivolt meter 154, for indicating the function or nonfunction of the apparatus. The thermocouples are connected in series, as shown schematically in FIGURE 1, so that two electro-motive potentials generated oppose each other; feeding the algebraic sum of the output to the millivolt meter 154 enabling each operator or authorized law enforcement official to note at a glance whether the system is functioning or not. As noted, the constantan wires of both thermocouples are connected at point A.

The zero point position of the needle is at midscale. When thermocouple 150 becomes the hotter, the needle will move to the right of the center and when thermocouple 151 becomes hotter the needle will move to the left of center. In the event that both thermocouples are heated to the same temperature, the needle will remain exactly on center; the effect of one thermocouple nullifying the effect of the other. In the event that everything is cold and the engine is started, the thermocouple 151 in the inlet 13 would start to heat and the needle moves to left or the "smog area." The exhaust gas cools off as it passes through the cold afterburner and the thermocouple 150 in the outlet 16 operates at considerably below the temperature of the first one, whereby the needle stays to the left. After some time, as the afterburner warms up, the second thermocouple gets warmer and the needle begins to creep back towards the center; however, if the afterburner is defective for some reason, the needle will never get back to center because the exhaust gas leaving will be colder than the exhaust gas entering.

If the afterburner is operating as intended, then the burning of the pollutants inside the afterburner releases heat energy and the gases leaving the afterburner at the outlet 16 will be hotter than those entering and the needle 136 will not only move to center but beyond, or to the ring of center, into the "no smog" region. While no definite measure of how much reduction of these specific pollutants is made, a qualitative indication is given whether the afterburner is working or not.

*Operation*

As the exhaust gases enter the inlet 13, through the open end 21, the stream of gases is reduced in transverse cross section by the nozzle 18 which results in an increase in velocity accompanied by a corresponding drop in pressure. Under all operating conditions of the engine, from idle to wide open throttle, this drop in pressure is sufficient to create a negative pressure (below atmospheric) at the openings 73 of the wall portion 24. This negative pressure is transmitted to the space between the wall portions 23 and 17, through the tubular passages 41 and through the annular chamber 40 and thereby to the openings 48 and 117.

Atmospheric air and blow-by gases can be drawn through the openings 73 to enter the pressure recovery portion of the tube 27 where they mix with the exhaust gases and the gases gradually slow down whereby most of the velocity head is converted back into pressure. The gases now traverse the secondary heat exchanger tube 27, rising in temperature as they do so, and, by the same token, preventing excessive temperature rise of the tube 27 in the process.

A mixture of exhaust gas, auxiliary air and blow-by gas enters the refractory-lined combustion chamber 30 and is ignited by a spark from spark plug 138 if the mixture is conductive thereto and the engine intake manifold vacuum at the moment happens to exceed seventeen inches Hg or is below nine inches Hg. If not, and the engine has been in operation long enough, approximately in excess of three minutes, the temperature of the combustion chamber 30 will be high enough to initiate chemical combination, spark or no spark.

To leave the combustion chamber 30, the gases must reverse their direction of flow and traverse the gradually converging annular channel 32 from the internal surface 68 of the catalyst support 60 to the external annular surface 69 thereof. In doing so, heat is imparted to the tubular member 27 which, in turn, is transferred to the inflowing charge of gases inside the tube. Outflowing gas must now fan out radially and pass through the slots 62 with which the refractory sleeve 60 is riddled. Here chemical action is more or less completed. On leaving the sleeve 60, the gases enter the gradually-expanding annular channel formed between the inner surface of the cylindrical wall 31 and the outer surface of the sleeve. They then wash over the outer surfaces of the passages 41 and enter the interior of the spherical cap 33 and finally leave the afterburner through the outlet 16.

While all this has been going on within the confines of the inner chamber, defined by the cylindrical wall 31, the latter has been effectively isolated from heat loss by the air space between the cylindrical walls 31 and 42. Under these conditions, the inner assembly will become considerably hotter than the outer jacket and will expand accordingly. It is for this reason that the sliding expansion joint of the boss 139 relative to the spherical wall 52 and wall 143 is provided.

Some heat will be transferred into the outer jacket by radiation. Loss of this heat is partially retarded by the insulation wrapper 50. The other barrier is a moving stream of auxiliary air and blow-by gases which is induced to flow through the annular chamber 40 by the aspirator. The moving stream picks up heat from all the metal surfaces it contacts but this heat is not a total loss; it serves to preheat these gases before they mix with the incoming stream of engine exhaust gases at the throat of the venturi 23. This is of great importance because the admixture of cold auxiliary air with the engine exhaust at the aspirator would tend to quench all chemical activity and the residence time within the afterburner would be too short to re-establish the activity.

In accordance with this invention, means 160 are provided for renewing or recoating the sleeve 60 and liner 57 with a metal-oxide, such means being continually, intermittently or automatically operative to recoat the refractory sleeve 60 and at the same time, the liner 57. As disclosed herein, such means includes a vacuum-powered injector pump 160 (see FIGURE 1) cooperative with a reservoir 162 containing a supply of catalyst-saturated solution (chromic acid or the like). The pump introduces the solution into the inlet 13 through a passageway 163, so that the catalyst-saturated solution is carried by the stream of incoming gases through the combustion chamber 30 and deposited on the surfaces of the sleeve 60 and liner 57 to replace catalyst material lost by erosion, thereby providing a renewed surface and a uniformly high efficiency of catalytic function.

It is to be understood that, in accordance with this invention, the pump 160 may be regulated, or otherwise controlled, for continually pumping fluid from the reservoir 162 to the inlet 13, as described above, or controlled to operate periodically at predetermined intermittent intervals so as to replace the lost catalyst on the liner 57 and the sleeve 60. The inner end of 165 of the catalyst passageway 163 is preferably coated as by a sleeve 166 of refractory material, as best seen in FIGURE 3, to reduce heat transfer thereto from the afterburner.

In the engine cylinder, ignition takes place after compression, whereby concentration of the combustible mixture is increased tremendously. By contrast, in the afterburner, chemical action, if any, must take place at substantially atmospheric pressure. In addition, presence of the carbon dioxide and water vapor formed by the initial combustion in the engine cylinder act as diluents to still further reduce the concentration of the components which remain to be burned. The afterburner therefore, would have two disadvantages to contend with, low pressure and low concentration. A direct flame afterburner attempts to offset these disadvantages by temperature regeneration. The catalytic afterburner attempts to offset these disadvantages by the use of the properties of catalytic material. This invention, on the other hand, provides a new and improved heat regenerative catalytic afterburner making use of the advantages offered by both.

As previously described, when the intake manifold vacuum drops below a selected low vacuum, such as nine inches Hg, or increases above a vacuum of about seventeen inches Hg, the ignition means 80 is operating and the valve plate 115 uncovers the opening 117 so that atmospheric air is drawn into the combustion chamber 30 for combustion with the unburned hydrocarbon, carbon monoxide, etc. in the engine exhaust and blow-by gases; said unburned substances being present in substantial quantities under these operating conditions. Gases leaving the combustion chamber pass through sleeve 60 where catalytic action takes place to continue the burning and to react carbon monoxide with nitrogen oxide to produce carbon dioxide and nitrogen; such conversion taking place in a favorable, low oxygen environment since most of the incoming oxygen in the air is consumed in the combustion chamber 30. A vacuum of nine inches or below (low vacuum range) corresponds to an accelerating condition for the engine whereas vacuum of seventeen inches and higher (high vacuum range) corresponds to idle condition and to deceleration condition.

The intermediate vacuum range between about nine inches and seventeen inches vacuum corresponds to cruise conditions during which the amount of unburned hydrocarbon, carbon monoxides, etc. in the exhaust gases and blow-by gases is low, and additional air is not required for combustion thereof. Under such conditions, opening 117 is covered by valve plate 115 and the ignition means 80 is inoperative so that combustion in chamber 30 will be unsupported. Because no atmospheric air is admitted during cruise, the catalyst on sleeve 60 will operate in a favorable, low oxygen environment for the oxidation-reduction process whereby CO is made to react with NO so that dangerously poisonous characteristics of both gases are nullified. Normally, high temperatures favor conversion of CO to $CO_2$ whereas high temperatures are detrimental to the reduction of NO to nitrogen. The presence of the catalyst permits reaction between the CO and NO resulting in oxidation of the CO to $CO_2$ and reduction of the NO to nitrogen; the reaction taking place with high efficiency at moderate temperatures. The active catalyst in $Cr_2O_3$ prepared in situ from $CrO_3$ and promoters can be added to the catalyst to obtain maximum efficiency therefrom; examples of such promoters being the soluble salts of elements 25 to 30 inclusive which are converted to oxides of the respective metals.

With further reference to the catalytic action of the $Cr_2O_3$ impregnated sleeve 60, it should be noted that this substance acts as a catalyst not only for the combination of NO and CO under a low oxygen environment but also acts as a catalyst for the combination of oxygen with CO, unburned and partially burned hydrocarbons under environments rich in oxygen. During idle, acceleration and deceleration conditions when the intake manifold vacuum is below about nine inches Hg or above about seventeen inches Hg, the fuel mixture in the engine is rich and there is a shortage of oxygen. Under such conditions, a high percentage of CO, unburned and partially burned hydrocarbons are present in the exhaust and the amount of NO is relatively small. By supplying additional atmospheric air to the combustion chamber 30 of the afterburner under these operating conditions, the catalyst in the presence of this additional air serves to promote the oxidization of CO to $CO_2$ and the complete burning of the unburned and partially burned hydrocarbons.

On the other hand, during the cruise operating range between about nine inches to seventeen inches Hg, a lean fuel mixture exists because of the excess of oxygen present. The exhaust products therefore contain smaller percentages of CO, unburned and partially burned hydrocarbons and a much higher portion of NO. Under this operating condition, no atmospheric air is added to the afterburner and the catalyst serves primarily to promote the reaction of CO and NO in the lower oxygen environment to produce $CO_2$ and nitrogen. It is understood that the purpose of the catalyst is to promote these reactions to take place at a rapid rate under lower temperature conditions so that the reactions are substantially accomplished before discharge of the gases to the atmosphere. It is further understood that ignition is present under all conditions when atmospheric air is admitted because of the operation of control unit 84. However, the ignition device could be completely eliminated once the combustion chamber becomes hot enough to support combustion although even under such conditions, ignition is preferable at least during deceleration.

While there is herein shown and described what is conceived to be the most practical and preferred embodiment of this invention; it is recognized that departures may be made therefrom within the scope of this invention which is not to be limited to the details disclosed herein but is to be accorded the full scope of the claims so as to embrace any and all equivalent devices.

What is claimed as new and desired to secure by Letters Patent is:

1. A catalytic afterburner for purifying exhaust gases of an internal combustion engine, and the like, comprising:
   means defining a first chamber having an inlet at one end, adapted to be connected to receive exhaust gases from the engine, and an outlet at the other end;
   said inlet end comprising a venturi nozzle having openings at the throat thereof for introducing other gases to said exhaust gases;
   an enlarged combustion chamber receiving all the gases discharged from said outlet end and discharging gases in a direction of flow opposite to that in the first chamber;
   a second annular chamber surrounding said first chamber and receiving the gases discharged from said combustion chamber;
   said second annular chamber having an outlet adjacent the inlet end of said first chamber;
   a foraminous sleeve of catalyst-impregnated material in said second chamber and intercepting said flow of gases prior to exit therefrom;
   means defining a third chamber surrounding said second chamber, said third chamber having a first inlet means adapted to be connected to the breather outlet of the crankcase of the engine for receiving gases therefrom and a second inlet means selectively connectible with atmospheric air to provide an auxiliary air supply, both said inlet means being located adjacent said combustion chamber, said third chamber having an outlet connecting with the openings in said nozzle to mix said gases from said crankcase and atmospheric air with said exhaust gases;
   valve means positionable to open and close said second air inlet means of said third chamber;
   ignition means in said combustion chamber for selectively igniting gases in said combustion chamber; and
   means responsive to changes of the inlet manifold pressure of the engine for actuating said valve means to close and open said second air inlet means of said second chamber and for actuating said ignition means.

2. A catalytic afterburner as defined in claim 1 wherein said chambers are defined by a plurality of casings, and means securing said casings in substantially concentric relationship at one end thereof to permit relative axial movement therebetween.

3. A catalytic afterburner for purifying exhaust gases of an internal combustion engine or the like, comprising:
   a combustion chamber receiving said exhaust gases for further combustion;
   means comprising catalytic means intercepting the discharge flow of said gases from said combustion chamber prior to exhaust to atmosphere; and
   control means responsive to the operating conditions of said engine for selectively introducing atmospheric air into said combustion chamber, said control means comprising means for introducing atmospheric air into said combustion chamber during operating conditions other than cruise and for closing off the flow of atmospheric air during cruise operation of the engine.

4. A catalytic afterburner as defined in claim 3 having ignition means located in said combustion chamber and controlled by said control means for operation upon introduction of atmospheric air to said combustion chamber.

5. A catalytic afterburner as defined in claim 3 wherein in said catalytic means comprises a foraminous sleeve of refractory material impregnated with a catalyst and having a plurality of passages through which said discharged gases flow.

6. A catalytic afterburner as defined in claim 5 having means for introducing said catalyst into said exhaust gases for coating said sleeve with catalyst during operation of said afterburner.

7. A catalytic afterburner as defined in claim 5 wherein said catalyst comprises $Cr_2O_3$.

8. A catalytitc afterburner as defined in claim 3 wherein said control means comprises:
   differential pressure means connected with inlet manifold vacuum on one side thereof; said introducing and closing means comprising
   valve means operable by said differential means to be open while the inlet manifold vacuum is in a low range or high range and to be closed when the inlet manifold vacuum is in an intermediate range, said valve means controlling the flow of atmospheric air to said combustion chamber.

9. A catalytic afterburner as defined in claim 4 wherein said control means comprises:
   differential pressure means connected with inlet manifold vacuum on one side thereof; said ignition means comprising
   spaced contact means operable by said differential means to be open while the inlet manifold vacuum is in a low range or high range and to be closed when the inlet manifold vacuum is in an intermediate range, said contact means actuating said ignition means when in the closed condition.

10. A catalytic afterburner as defined in claim 9 wherein said introducing and closing means comprises;
    valve means operable by said differential means to be open while the inlet manifold vacuum is in a low range of high range and to be closed when the inlet manifold vacuum is in an intermediate range, said valve means controlling the flow of atmospheric air to said combustion chamber.

11. A catalytic afterburner for purifying exhaust gases of an internal combustion engine comprising:
    a passageway for receiving the exhaust gases from said engine;
    catalytic means in said passageway and over which the exhaust gases flow prior to discharge to atmosphere; and
    means for selectively introducing atmospheric air to said exhaust gases prior to entering said catalytic means, said introducing means being closed to atmospheric air only during cruise operation of the engine so that said catalytic means promotes the combustion of unburned substances which are predominant in the exhaust under operating conditions other than cruise and promotes the reaction of carbon monoxide and nitrogen oxide, the latter being present in larger amounts in the exhaust gases during cruise operation.

12. A catalytic afterburner as defined in claim 11 wherein said catalytic means comprises:
    a foraminous sleeve extending transversely across said passageway from the inlet to the outlet end and containing a plurality of openings transverse to said sleeve;
    said sleeve being impregnated with a catalyst to cause intimate contact between the exhaust gases and the catalyst.

13. A catalytic afterburner as defined in claim 12 wherein said catalyst comprises $Cr_2O_3$ and having:

means for introducing said catalyst to said exhaust gases upstream and said catalytic means in order to deposit additional catalyst on said sleeve during operation of said afterburner.

References Cited by the Examiner

UNITED STATES PATENTS

| | | | |
|---|---|---|---|
| 1,789,812 | 1/1931 | Frazer | 60—30 X |
| 2,203,554 | 6/1940 | Uhri et al. | |
| 2,658,339 | 11/1953 | Bonsall. | |
| 2,807,930 | 10/1957 | Bratton | 60—30 |
| 2,880,079 | 3/1959 | Cornelius | 60—29 X |
| 2,937,490 | 5/1960 | Calvert | 60—30 |
| 3,032,983 | 5/1962 | Embree | 60—39.09 |
| 3,053,773 | 9/1962 | Calvert | 252—413 X |
| 3,091,920 | 6/1963 | Matvay | 60—30 |

SAMUEL LEVINE, *Primary Examiner.*

JULIUS E. WEST, *Examiner.*